US007390562B2

(12) United States Patent
Onuki et al.

(10) Patent No.: US 7,390,562 B2
(45) Date of Patent: Jun. 24, 2008

(54) ELECTRICALLY CONDUCTIVE MEMBER

(75) Inventors: Akio Onuki, Ibaraki-ken (JP); Koji Nishiya, Ibaraki-ken (JP)

(73) Assignee: Kinyosha Co., Ltd., Tokyo (JP)

( * ) Notice: Subject to any disclaimer, the term of this patent is extended or adjusted under 35 U.S.C. 154(b) by 54 days.

(21) Appl. No.: 11/008,837

(22) Filed: Dec. 10, 2004

(65) Prior Publication Data

US 2005/0127333 A1 Jun. 16, 2005

(30) Foreign Application Priority Data

Dec. 12, 2003 (JP) ............................ 2003-414755

(51) Int. Cl.
*B32B 5/22* (2006.01)
*B32B 5/16* (2006.01)
*B32B 27/38* (2006.01)

(52) U.S. Cl. .................. 428/317.9; 428/318.4; 428/327; 428/413; 428/418

(58) Field of Classification Search .............. 428/317.9, 428/318.4, 327, 413, 418
See application file for complete search history.

(56) References Cited

U.S. PATENT DOCUMENTS

| | | | | |
|---|---|---|---|---|
| 4,898,689 | A * | 2/1990 | Hamada et al. | 252/510 |
| 6,108,509 | A * | 8/2000 | Okada et al. | 399/286 |
| 6,172,154 | B1 * | 1/2001 | Brown et al. | 524/495 |
| 6,283,903 | B1 | 9/2001 | Onuki et al. | |
| 6,458,883 | B1 * | 10/2002 | Takashima et al. | 524/495 |
| 2001/0026709 | A1 | 10/2001 | Hara et al. | |
| 2002/0022142 | A1 * | 2/2002 | Harada | 428/493 |
| 2003/0175045 | A1 | 9/2003 | Hara | |
| 2004/0135129 | A1 * | 7/2004 | Hattori et al. | 252/510 |

FOREIGN PATENT DOCUMENTS

| | | |
|---|---|---|
| EP | 1364991 A1 | 11/2003 |
| JP | 4-85341 | 3/1992 |
| JP | 2001-242725 | 9/2001 |
| JP | 2002-3651 | 1/2002 |
| JP | 2002-116638 | 4/2002 |
| JP | 2002-229350 | 8/2002 |

OTHER PUBLICATIONS

Aug. 2, 2005 official Communication and European Search Report in connection with corresponding European Patent Application No. EP 04 02 9495.

* cited by examiner

*Primary Examiner*—Kevin R. Kruer
(74) *Attorney, Agent, or Firm*—John P. White; Cooper & Dunham LLP

(57) ABSTRACT

Disclosed is an electrically conductive member, comprising a substrate of a metal or a resin and an electrically conductive elastic layer formed to cover the substrate, wherein the electrically conductive elastic layer is formed of a rubber elastic body prepared by dispersing at least an electrically conductive powder used as a conductive agent into a rubber compound, followed by vulcanizing the rubber compound, the electrically conductive powder being obtained by curing and powdering an electrically conductive rubber compound or an electrically conductive resin mixture.

14 Claims, 3 Drawing Sheets

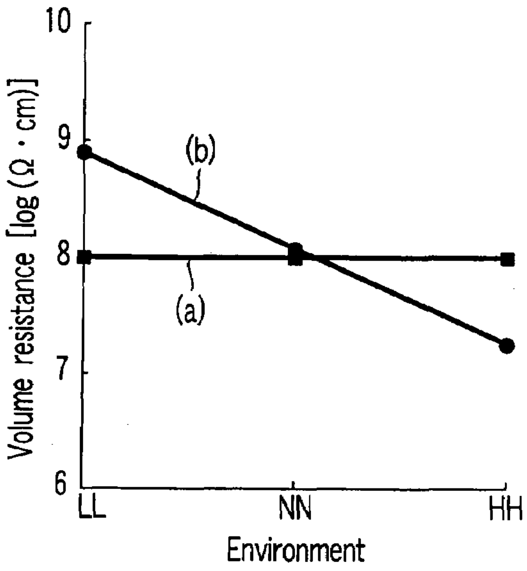
FIG. 6
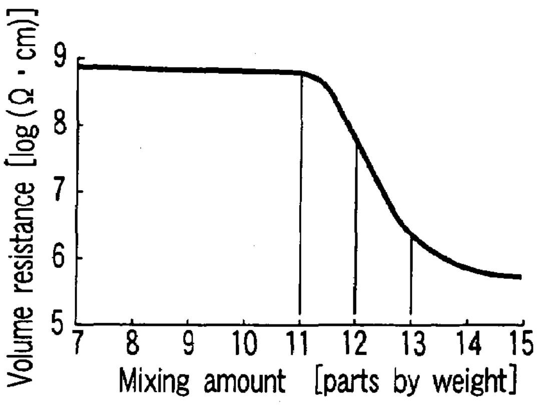
FIG. 8
FIG. 7
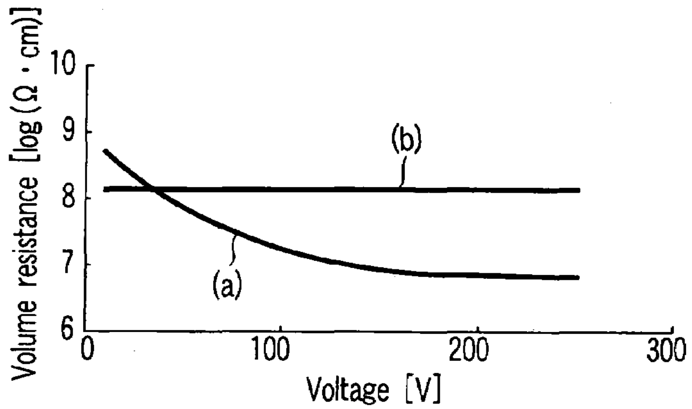
FIG. 9
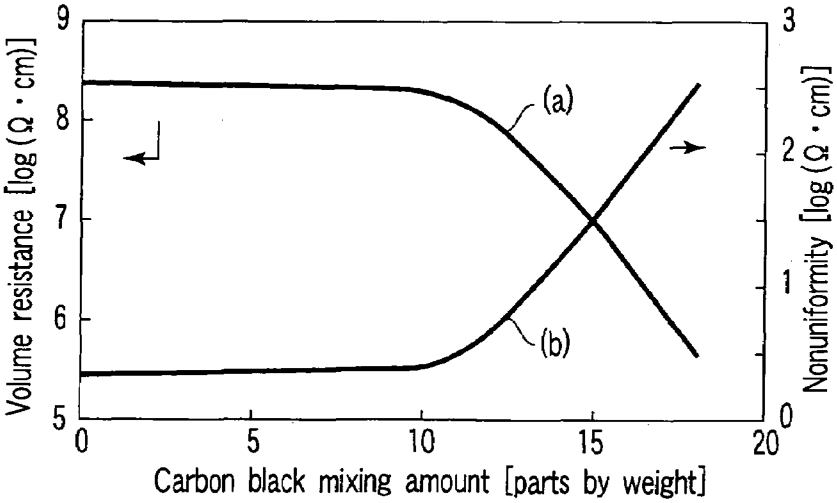

ELECTRICALLY CONDUCTIVE MEMBER

CROSS-REFERENCE TO RELATED APPLICATIONS

This application is based upon and claims the benefit of priority from prior Japanese Patent Application No. 2003-414755, filed Dec. 12, 2003, the entire contents of which are incorporated herein by reference.

BACKGROUND OF THE INVENTION

1. Field of the Invention

The present invention relates to an electrically conductive member, particularly, to an electrically conductive member used in at least one of the transfer roll, the charging roll, the developing roll, the cleaning roll, the transfer belt, the intermediate transfer belt and the intermediate transfer drum arranged around the photosensitive drum (image carrier) included in an electrophotographic printing apparatus such as a copier, a printer, or a facsimile machine.

2. Description of the Related Art

As known in the art, an electrophotographic printing apparatus such as a copier, a printer or a facsimile machine is constructed as shown in FIG. 1. Reference numeral 1 shown in the drawing denotes a photosensitive drum. Arranged around the photosensitive drum 1 are a charging roll 2, a laser beam irradiating section 3, a developing section 4, a primary transfer roll 5 and a cleaning roll 6. An intermediate transfer belt 8 supported by a plurality of support rolls 7*a*, 7*b*, 7*c* extends through the clearance between the photosensitive drum 1 and the primary transfer roll 5. Also, a blade 9 for removing the toner remaining on the intermediate transfer belt 8 is arranged in the vicinity of the intermediate transfer belt 8. Further, a secondary transfer roll 10 is arranged at the position facing the support roll 7*b* such that a paper sheet 11 is transferred through the clearance between the secondary transfer roll 10 and the support roll 7*b*. The paper sheet 11 having the toner transferred thereonto is thermally fixed by a fixing device 12, thereby obtaining a printed matter.

The electrophotographic printing apparatus constructed as shown in FIG. 1 is operated as follows. In the first step, an electric field is applied to the charging roll 2 so as to charge the charging roll 2, followed by forming a latent image in the laser beam irradiating section 3 formed on the photosensitive drum 1 and subsequently transferring the toner onto the photosensitive drum 1. Then, a bias is applied to the primary transfer roll 5 so as to transfer the toner attached to the photosensitive drum 1 onto the intermediate transfer belt 8.

Further, a bias is applied to the secondary transfer roll 10 so as to transfer the toner attached to the intermediate transfer belt 8 onto the paper sheet 11. Still further, the paper sheet 11 having the toner image transferred thereonto is transferred to the fixing device 12. As a result, the toner image transferred onto the paper sheet 11 is thermally fixed, thereby obtaining desired printed matter.

An electrically conductive member prepared by imparting electric conductivity to an elastic rubber or resin is used in any of the charging roll 2, the primary transfer roll 5, the cleaning roll 6, the intermediate transfer belt 8, and the secondary transfer roll 10. The electrical characteristics required for the electrically conductive members arranged around the photosensitive drum 1 include, for example, the characteristics that nonuniformity of resistance should be small, that the dependency of the resistance on the environment should be low, and that the dependency of the resistance on the voltage should be low. Further, the electrically conductive member is required to exhibit elasticity and, particularly, low hardness and a small compression set. A material prepared by imparting electrical conductivity to an elastic rubber having a high molecular weight is used in general as the electrically conductive member.

The high molecular weight elastic rubber is made electrically conductive by dispersing an ionic conductive agent or an electronic conductive agent into the high molecular weight elastic rubber. However, the ionic conductivity and the electronic conductivity are exactly opposite to each other in their electric characteristics, as shown in Table 1 below. For example, in the case of the electrically conductive member prepared by using an ionic conductive agent, the resistance of the electrically conductive member is lowered under a high-temperature, high-humidity (HH) environment so as to make it impossible to obtain an appropriate current even if the resistance of the electrically conductive member is set at an appropriate value under a normal-temperature, normal-humidity (NN) environment, as shown in FIG. 6. It follows that an image defect is brought about. Also, under a low-temperature, low-humidity (LL) environment, the resistance is increased so as to make it impossible to obtain an appropriate current. An image defect is brought about in this case, too. Incidentally, line a in FIG. 6 denotes the use of an electronic conductive agent, and line b denotes the use of an ionic conductive agent.

TABLE 1

| Type of conductivity | Determination of resistance | Current speed | Nonuniformity in resistance | Dependency on voltage | Dependency on environment | Resistance elevation |
|---|---|---|---|---|---|---|
| Ionic conductivity | Ion concentration | Slow | Small | Small | Large | Small |
| Electronic conductivity | Distance between adjacent particles having electronic conductivity | Fast | Large | Large | Small | Large |

Also, as shown in FIG. 7, in the case of the electrically conductive member prepared by using an electronic conductive agent, the electrically conductive member is characterized in that the resistance is increased under a low voltage so as to make it difficult to obtain an appropriate current under a low voltage. Incidentally, line a shown in FIG. 7 denotes the use of an electronic conductive agent, and line b denotes the use of an ionic conductive agent. Further, in the case of electronic conductive agent, as shown in FIG. 8, the resistance is varied depending on the mixing amount of the conductive rapidly agent in the region of the intermediate resistance. Still further, as shown in FIG. 9, nonuniformity in resistance is increased among the different parts within one product or among several products due to nonuniform dispersion of the electronic conductive agent in the manufacturing stage. Incidentally, curve a shown in FIG. 9 denotes the volume resistance, and curve b denotes the nonuniformity in resistances. Recently, it has been attempted to moderate the defects of the ionic conductivity and the electronic conductivity by means of hybridization, in which both the ionic conductive agent and the electronic conductive agent are dispersed in, for example, an elastic rubber material. Incidentally, the term "hybridization" denotes complex conductivity including the ionic conductivity and the electronic conductivity.

In general, the hybridization of the ionic conductivity and the electronic conductivity is intended to manufacture an electrically conductive member having a small dependency of the resistance on the voltage and a small dependency of the resistance on the environment. The hybridization is achieved by dispersing an electronic conductive agent such as electrically conductive carbon black or particles of a metal oxide into a rubber compound or resin that has been made conductive in advance by the mixing of an ionic conductive agent, followed by vulcanizing or thermally setting the resin.

However, the electronic conductive agent is unsatisfactory in its dispersion capability and gives rise to a large variation in resistance of the electrically conductive member in the middle resistance region. As a result, it is difficult to achieve subtle control of the resistance relying on the electronic conductivity. Such being the situation, it has been difficult to moderate the defects in the characteristics of the ionic conductivity and the defects in the characteristics of the electronic conductivity by the hybridization.

FIGS. 10A to 10D show the resistance distribution of the press sheets of size 1.5 mm (thickness)×200 mm (width)×300 mm (length), which were prepared by using conductive agents of different conductivity systems. Specifically, shown is the comparison of the nonuniformity in the resistances (the logarithm of resistance: unit of (Ω·cm) depending on the difference in the conductivity system under voltage application of 100V. FIG. 10A covers the case of using an ionic conductive agent. As shown in the drawing, the logarithm of the maximum resistance was 8.05 log(Ω·cm) and the minimum resistance was 7.94 log(Ω·cm). It follows that the difference between the maximum resistance and the minimum resistance was 0.11 log(Ω·cm), supporting that the nonuniformity of resistance was small. FIG. 10B covers the case of using an electronic conductive agent. As shown in the drawing, the maximum resistance was 8.49 log(Ω·cm) and the minimum resistance was 7.81 log(Ω·cm). It follows that the difference between the maximum resistance and the minimum resistance was 0.68 log(Ω·cm), supporting that nonuniformity of the resistance was large. FIG. 10C covers the case of the hybridization performed by the above general method of using both an ionic conductive agent and an electronic conductive agent. As shown in the drawing, the maximum resistance was 7.43 log(Ω·cm) and the minimum resistance was 6.86 log(Ω·cm). It follows that the difference between the maximum resistance and the minimum resistance was 0.57 log(Ω·cm), supporting that the nonuniformity of resistance was not small. Further, FIG. 10D covers the case of the hybridization performed by using an electrically conductive powder according to the present invention. As shown in the drawing, the maximum resistance was 7.88 log(Ω·cm) and the minimum resistance was 7.70 log(Ω·cm). It follows that the difference between the maximum resistance and the minimum resistance was 0.18 log(Ω·cm), supporting that the nonuniformity of resistance was small.

As pointed out above, it is impossible to secure a stable resistance by using an electronic conductive agent or an ionic conductive agent or by the general hybridization using both an ionic conductive agent and an electronic conductive agent, leading to an image defect.

The electrically conductive members are disclosed in patent documents 1 to 5 given below:

Patent Document 1 (Japanese Patent Disclosure (Kokai) No. 4-85341):

Patent document 1 discloses an electrically conductive silicone rubber sponge prepared by mixing an electrically conductive rubber powder obtained from a vulcanized conductive silicone rubber into an unvulcanized silicone rubber. In this case, carbon black is contained as a conductivity imparting agent in the electrically conductive powder.

In general, if carbon black is mixed with an unvulcanized silicone rubber, the vulcanization is retarded, resulting in failure to obtain a uniform sponge. Such being the situation, the technology disclosed in patent document 1 is intended to obtain an electrically conductive silicone rubber sponge having uniform sponge properties by mixing the electrically conductive rubber powder containing carbon black into the unvulcanized silicone rubber. However, patent document 1 does not teach the technical idea of stabilizing the electrical characteristics by the hybridization of the ionic conductivity and the electronic conductivity.

Patent Document 2 (Japanese Patent Disclosure No. 2001-242725):

Patent document 2 discloses an intermediate transfer member comprising a substrate and at least a surface layer of the substrate. It is taught that the intermediate transfer member is characterized in that the surface layer contains both a conductive agent serving to impart electronic conductivity and another conductive agent serving to impart ionic conductivity. Patent document 2 also teaches that carbon black having the fluorination treated surface acts as a conductive agent serving to impart electronic conductivity, and that the conductive agent serving to impart ionic conductivity is selected from the group consisting of a cationic surfactant, an anionic surfactant, an amphoteric surfactant, and a nonionic surfactant.

Patent Document 3 (Japanese Patent Disclosure No. 2002-116638):

Patent document 3 discloses an electrically conductive roller comprising a roller core and an elastic polymer layer formed to cover the roller core. It is taught that the elastic polymer is prepared by dispersing a conductive substance having electronic conductive mechanism into an electrically conductive material to which is imparted a conductive substance having ionic conductive mechanism, and that the elastic polymer has a hardness of 5 to 70° (Asker C hardness).

Each of patent documents 2 and 3 pointed out above refers to the hybridization of the electronic conductivity and the ionic conductivity, which is carried out in general. However, in the method disclosed in each of patent documents 2 and 3, the resistance tends to be varied in the middle resistance region of 6 to 9 log(Ω·cm) as pointed out previously. It should be noted that it is difficult to obtain a stable resistance because of nonuniform dispersion of the electronic conductive agent and the error in the mixing amount of the electronic conductive agent.

Patent Document 4 (Japanese Patent Disclosure No. 2002-229350):

Patent document 4 discloses an electrically conductive transfer roller comprising a first conductive elastic layer formed to cover a core metal, a second conductive elastic layer formed on the first conductive elastic layer, and a coated layer having release property formed on the second conductive elastic layer. According to this patent document, the conductive transfer roller is characterized in that the conductivity by the electronic conductivity, by the ionic conductivity or by the hybrid conductivity of the electronic conductivity and the ionic conductivity is imparted to each of the first conductive elastic layer and the second conductive elastic layer. Concerning the conductive agent, patent document 4 also teaches that it is possible to employ the electronic conductivity produced by electrically conductive carbon, the ionic conductivity produced by, for example, lithium perchlorate, or the hybrid conductivity including both the electronic conductivity and the ionic conductivity.

Patent Document 5 (Japanese Patent Disclosure No. 2002-3651):

Patent document 5 discloses a semiconductive rubber composition of an island-ocean structure comprising a polymer consecutive phase consisting of a rubber material having ionic conductivity and a polymer grain phase consisting of a rubber material having electronic conductivity. It is taught that the rubber material having the ionic conductivity contains mainly a raw material rubber A having a volume resistivity not higher than $1\times10^{12}\Omega\cdot$cm. It is also taught that electrically conductive particles are mixed into a raw material rubber B so as to make conductive the rubber material having the electronic conductivity.

Patent document 5 also teaches that a master batch is prepared by adding electrically conductive particles such as electrically conductive carbon black to the raw material rubber B alone, followed by blending the resultant master batch with the raw material rubber A so as to prepare a semiconductive rubber composition. In addition, patent document 5 teaches that the raw material rubber A is a polar rubber, and that the raw material rubber B is incompatible with the raw material rubber A. What should be noted is that the raw material rubber B forming the polymer grain phase in blended with the raw material rubber A forming a polymer consecutive phase in the unvulcanized state, followed by vulcanizing the mixture of the raw material rubbers A and B. It follows that the island-ocean structure of the polymer consecutive phase and the grain phase is formed by utilizing the incompatibility between the raw material rubbers A and B.

In the semiconductive rubber composition disclosed in patent document 5, however, it is necessary for the raw material rubbers A and B to differ from each other in polarity and to be incompatible with each other in order to form the island-ocean structure. Also, in order to form the island-ocean structure, it is necessary for the Sp value of the raw material rubber B to be smaller than that of the raw material rubber A, and it is necessary for the difference in the Sp value to be large. It follows that the range of selection of the polymers used is limited. It should also be noted that, since the island-ocean structure is formed by applying vulcanization to the raw material rubber after blending of the unvulcanized raw material rubber, the process conditions such as the viscosity and the blending ratio of the raw material rubbers A and B as well as the temperature and the time in the mixing process are much restricted in order to obtain a prescribed island-ocean structure. Further, patent document 5 teaches the phenomenon that some electrically conductive particles are allowed to migrate into the polymer consecutive layer, indicating that the semiconductive rubber composition disclosed in this patent document is insufficient for the control and stabilization of the electrical characteristics.

BRIEF SUMMARY OF THE INVENTION

An object of the present invention is to provide an electrically conductive member in which the dispersion capability of the electronic conductive agent is improved by employing the hybridization of the ionic conductivity and the electronic conductivity so as to achieve fine adjustment of the resistance, thereby overcoming the defect of the electronic conductivity so as to diminish increase in resistance at a low voltage, thereby overcoming the defect of the ionic conductivity so as to diminish the variation in resistance depending on variation in the environment and, thereby obtaining a stable image.

According to a first aspect of the present invention, there is provided an electrically conductive member, comprising-a substrate of a metal or a resin and an electrically conductive elastic layer formed to cover the substrate, wherein the electrically conductive elastic layer is formed of a rubber elastic body prepared by dispersing at least an electrically conductive powder used as a conductive agent into a rubber compound, followed by vulcanizing the rubber compound, the electrically conductive powder being obtained by curing and powdering an electrically conductive rubber compound or an electrically conductive resin mixture.

According to a second aspect of the present invention, there is provided an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having ionic conductivity, followed by vulcanizing the rubber compound having the ionic conductivity, the electrically conductive powder being obtained by curing and powdering a rubber compound having electronic conductivity or a resin mixture having electronic conductivity.

According to a third aspect of the present invention, there is provided an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having electronic conductivity, followed by vulcanizing the rubber compound having the electronic conductivity, the electrically conductive powder being obtained by curing and powdering a rubber compound having ionic conductivity or a resin mixture having ionic conductivity.

According to a fourth aspect of the present invention, there is provided an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having electronic conductivity or a rubber compound having ionic conductivity, followed by vulcanizing the rubber compound having the electronic conductivity or the rubber compound having the ionic conductivity, the electrically conductive powder being obtained by curing and powdering a rubber compound having composite conductivity or a resin mixture having composite conductivity.

Further, according to a fifth aspect of the present invention, there is provided an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having composite conductivity, followed by vulcanizing the rubber compound having the composite conductivity, the electrically conductive powder being obtained by curing and powdering a rubber compound having any of electronic conductivity, ionic conductivity and composite conductivity, or a resin mixture having any of electronic conductivity, ionic conductivity and composite conductivity.

According to the present invention, it is possible to overcome the defect inherent in the electronic conductivity so as to suppress the elevation of resistance at a low voltage. It is also possible to overcome the defect inherent in the ionic conductivity so as to suppress the variation in resistance depending on fluctuation of the environment. It follows that the present invention makes it possible to provide an electrically conductive member that permits obtaining a picture image with high stability.

BRIEF DESCRIPTION OF THE SEVERAL VIEWS OF THE DRAWING

FIG. 6 is a graph showing the relationship between the environment (LL [low temperature, low humidity] environment, NN [normal temperature, normal humidity] environment, HH [high temperature, high humidity] environment) and the volume resistivity;

FIG. 7 is a graph showing the relationship between the voltage and the volume resistivity;

FIG. 8 is a graph showing the relationship between the mixing amount of carbon black and the volume resistivity;

FIG. 9 is a graph showing the relationship between the mixing amount of carbon black and the volume resistivity and the relationship between the mixing amount of carbon black and the nonuniformity of resistances;

DETAILED DESCRIPTION OF THE INVENTION

The electrically conductive member of the present invention will now be described in detail.

Figure 10A:
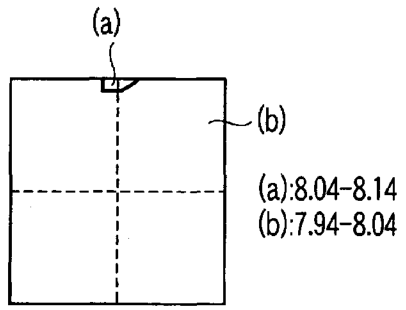
FIGS. 10A to 10D show the nonuniformity of resistances depending on the difference in the conductivity type.
Figure 10B:
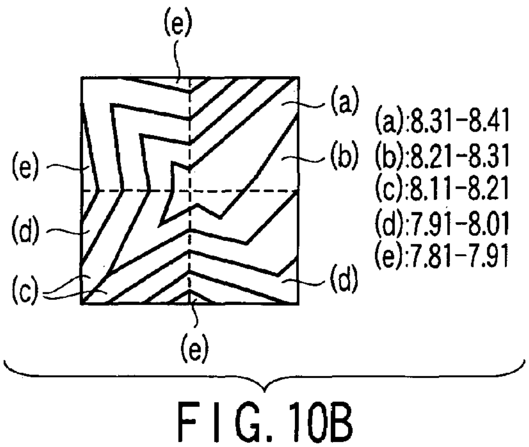
Figure 10C:
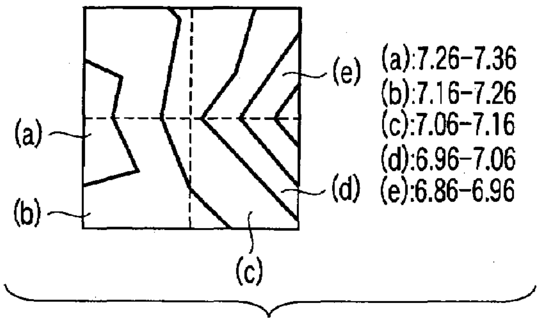
Figure 10D:
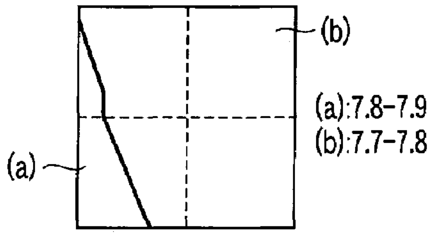

As a result of an extensive research, the present inventors have found that, in order to moderate the defects inherent in the ionic conductivity and the electronic conductivity, it is effective to use powder of vulcanized rubber or hardened resin having ionic conductivity, electronic conductivity or the hybridized conductivity containing both the ionic conductivity and electronic conductivity so as to arrive at the present invention. To be more specific, it is effective to mix the above mentioned powder into ionic, electronic or hybridized conductive a rubber compound or a resin so as to achieve the hybridization. It has been found that, in this case, it is possible to diminish the nonuniformity in the resistances of the product of the electrically conductive member (see FIG. 10D), to suppress a rapid variation in the resistances in the middle resistance region, to diminish the dependency of the resistance on the voltage so as to overcome the defect inherent in the electronic conductivity, and to diminish the dependency of the resistance on the environment so as to overcome the defect inherent in the ionic conductivity.

1) The electrically conductive member according to the first aspect of the present invention is directed to an electrically conductive member, comprising a substrate of a metal or a resin and an electrically conductive elastic layer formed to cover the substrate, wherein the electrically conductive elastic layer is formed of a rubber elastic body prepared by dispersing at least an electrically conductive powder used as a conductive agent into a rubber compound, followed by vulcanizing the rubber compound, said electrically conductive powder being obtained by curing and powdering an electrically conductive rubber compound or an electrically conductive resin mixture.

2) The electrically conductive member according to the second aspect of the present invention is directed to an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having an ionic conductivity, followed by vulcanizing the rubber compound having the ionic conductivity, said electrically conductive powder being obtained by curing and powdering a rubber compound having an electronic conductivity or a resin mixture having an electronic conductivity.

3) The electrically conductive member according to the third aspect of the present invention is directed to an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having an electronic conductivity, followed by vulcanizing the rubber compound having the electronic conductivity, said electrically conductive powder being obtained by curing and powdering a rubber compound having an ionic conductivity or a resin mixture having an ionic conductivity.

4) The electrically conductive member according to the fourth aspect of the present invention is directed to an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having an electronic conductivity or a rubber compound having an ionic conductivity, followed by vulcanizing the rubber compound having the electronic conductivity or the rubber compound having the ionic conductivity, said electrically conductive powder being obtained by curing and powdering a rubber compound having a composite conductivity or a resin mixture having a composite conductivity.

5) Further, the electrically conductive member according to the fifth aspect of the present invention is directed to an electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into a rubber compound having a composite conductivity, followed by vulcanizing the rubber compound having the composite conductivity, said electrically conductive powder being obtained by curing and powdering a rubber compound having any of an electronic conductivity, an ionic conductivity and a composite conductivity, or a resin mixture having any of an electronic conductivity, an ionic conductivity and a composite conductivity.

The present invention will now be described more in detail.

It is possible to allow an insulating material such as rubber or resin to be electrically conductive by mixing, for example, an ionic conductive agent or an electronic conductive agent into the insulating material. However, the ionic conductivity and the electronic conductivity are exactly opposite to each other in the electrical characteristics as shown in Table 1 referred to previously. As a result, it is very difficult to use any of the ionic conductive agent and the electronic conductive agent in the middle resistance region in which are used the electrically conductive members arranged around the photosensitive drum.

In general, it is attempted to moderate the characteristics of the ionic conductivity and the electronic conductivity by means of the hybridization between the ionic conductivity and the electronic conductivity. However, the electronic conductive agent leaves room for further improvement in its dispersion capability and gives rise to a rapid change in its resistance in the middle resistance region. Such being the situation, it is difficult nowadays to obtain a stable effect of moderating the characteristics.

Under the circumstances, the present inventors have proposed a measure for coping with the difficulty in respect of the dispersion capability and with a rapid variation of the resistance in the middle resistance region in respect of the electronic conductive agent. To be more specific, it has been proposed to cure and powder (or finely pulverize) rubber or resin by using an ionic conductive agent, an electronic conductive agent or a hybridized conductive agent containing both the ionic and electronic conductive agents, followed by mixing the electrically conductive powder thus obtained into an electrically conductive rubber mixture (i.e., a rubber compound) or a resin mixture so as to improve the dispersion capability and to eliminate the rapid variation in the electrical resistance, thereby moderating the characteristics of the ionic conductivity and the electronic conductivity. It should be noted that the nonuniformity in the resistances caused by the defective dispersion can be suppressed by mixing a large amount of the electrically conductive powder proposed this time. Also, the fluctuation in the resistance can be much suppressed by mixing a large amount of the electrically conductive powder. It follows that the balance between the dependency of the resistance on the environment and the dependency of the resistance on the voltage can be improved so as to make it possible to reproduce an image with a high stability without being affected by the temperature and the humidity.

In the present invention, the rubber provided for the rubber compound includes, for example, a natural rubber (NR), a nitrile rubber (NBR), an epichlorohydrin rubber (ECO), a hydrogenated nitrile rubber (HNBR), a butadiene rubber (BR), a styrene-butadiene rubber (SBR), an isoprene rubber (IR), an ethylene-propylene rubber (EPM, EPDM), a fluorinated rubber, a silicone rubber, and an alloy thereof.

In the present invention, the resin provided for the resin mixture includes, for example, a vinyl chloride resin (PVC), a vinyl acetate resin, a polyurethane resin (UR), a thermoplastic urethane resin, a thermosetting urethane resin, and an epoxy resin.

The additives that are mixed with the rubber in the present invention include, for example, a vulcanizing agent, a vulcanization accelerator, a co-crosslinking agent, an antioxidant, a plasticizer, a reinforcing agent, and a filler.

It is possible to use, for example, sulfur, a sulfur-containing organic compound, and an organic peroxide as the vulcanizing agent. The mixing amount of the vulcanizing agent to rubber should generally be 0.1 to 20 parts by weight, preferably 0.1 to 10 parts by weight, based on 100 parts by weigh of rubber. If the mixing amount of the vulcanizing agent is smaller than 0.1 part by weight, it is possible for the vulcanization to be rendered incomplete. On the other hand, if the mixing amount of the vulcanizing agent exceeds 20 parts by weight, it is possible for the rubber hardness to be increased so as to impair the elasticity.

The vulcanization accelerator used in the present invention includes, for example, magnesium oxide (MgO); thiuram compounds such as tetramethyl thiuram disulfide and tetraethyl thiuram disulfide; dithio carbamates such as zinc dibutyl dithio carbamate and zinc diethyl dithio carbamate; thiazoles such 2-mercapto benzothiazole and N-cyclohexyl-2-benzothiazolyl sulfenamide; and thio ureas.

The vulcanization assistant used in the present invention includes, for example, zinc oxide, a metal oxide, and fatty acids such as stearic acid and oleic acid.

The co-crosslinking agent used in the present invention includes the co-crosslinking agents having its function performed by, for example, an organic peroxide, which are known to the art, such as ethylene glycol-dimethacrylate, trimethylol propane, trimethacrylate, a polyfunctional methacrylate monomer, triallyl isocyanate, and a metal-containing monomer.

The antioxidant used in the present invention includes, for example, imidazoles such as 2-mercapto benz imidazole, phenyl-α-naphtyl amine, NN-di-β-naphthyl-p-phenylene diamine and phenols such as styrenated phenol.

The softening agent used in the present invention includes, for example, a fatty acid such as stearic acid as well as paraffin wax, and factice.

Further, the reinforcing agent used in the present invention include, for example, carbon black and white carbon.

In the present invention, the electrically conductive member of a solid single layer structure does not give rise to any problem. However, it is desirable for the electrically conductive member to be in the form of a sponge that is obtained by using, for example, a blowing agent in the case where a low hardness is required for the electrically conductive member. It is also possible for the electrically conductive member of the present invention to be in the form of a laminate structure consisting of an optional combination of a solid layer and a sponge layer. The blowing agent referred to above includes typically chemical blowing agents such as sodium bicarbonate, DPT of a nitroso compound series (trade name of Cellular D, manufactured by Eiwa Kasei K.K.), azo-dicarbonamide of an azo compound series (trade name of "Vinyhole AC#3", manufactured by Eiwa Kasei K.K.) and benzene sulfonyl hydrazide of a sulfonyl hydrazide series (trade name of "Neo-cellborn N#1000S", manufactured by Eiwa Kasei K.K.).

In the present invention, it is desirable to form a toner releasing layer on the surface of the layer of the electrically conductive member. If the toner releasing layer is not formed, the toner is attached to the surface of the rubber layer (layer of the electrically conductive member) so as to impair the image formation. The toner releasing layer can be formed by spray coating of a toner releasing material on the rubber layer, though the method of forming the toner releasing layer is not limited to the spray coating method noted above. The materials of the toner releasing layer include, for example, an FEUA modified fluorine resin paint (manufactured by Asahi Glass K.K.), a fluorine-containing polyol modified fluorine resin paint (manufactured by Sumitomo Seika K.K.), a PUDF modified fluorine resin paint (manufactured by Kansai Paint K.K.), a polyurethane modified fluorine resin paint (manufactured by Nippon Lactone K.K. and Nippon Bee chemical co., Ltd), an acrylic modified fluorine resin paint (manufactured by Acheson (Japan) Limited), a phenol modified fluorine resin paint (manufactured by Acheson (Japan) Limited), an alkyd modified fluorine silicone paint (manufactured by Shin-etsu Chemical Co, Ltd), an acrylic modified silicone paint (manufactured by Shin-etsu Chemical Co, Ltd), a water-soluble Nylon (manufactured by Teikoku Kagaku K.K. and Nippon Bee chemical co., Ltd), and N-methyl methoxylated Nylon (manufactured by Teikoku Kagaku K.K. and Nippon Bee chemical co., Ltd).

The electrically conductive member of the present invention comprises a substrate consisting of a metal or a resin and an electrically conductive rubber layer formed to cover the substrate. Where the electrically conductive member is used as a roll, a cylindrical member made of iron or aluminum is used as the substrate. On the other hand, where the electrically conductive member is used as a belt, a known member such as a resin belt is used as the substrate.

The conductive agents used in the electrically conductive member of the present invention can be classified into an electronic conductive agent and an ionic conductive agent.

The electronic conductive agent includes, for example, an electrically conductive carbon black, a powder of a metal oxide, and the electrically conductive powder subjected to the surface treatment. Further, the ionic conductive agent that permits achieving the ionic conduction by the addition of the ionic conductive agent includes, for example, tetracyano ethylene and derivatives thereof, benzoquinone and derivatives thereof, ferrocene and derivatives thereof, charge transfer substances such as dichloro cyano benzoquinone and derivatives thereof, inorganic ionic substances such as potassium perchlorate, cationic surfactants and amphoteric surfactants. In addition, epichlorohydrin rubber coupled with ethylene oxide can be used as rubber having an ionic conductivity.

In the present invention, the term "rubber compound having an electronic conductivity" denotes a rubber compound having the electronic conductive agent mixed therein. The term "electronic conductive rubber" denotes a rubber obtained by applying vulcanization to the rubber compound having an electronic conductivity. The term "rubber compound having an ionic conductivity" denotes a rubber compound having the ionic conductive -agent mixed therein or a compound of the rubber, said rubber itself having an ionic conductivity, such as epichlorohydrin. The term "rubber having an ionic conductivity" denotes a rubber obtained by applying a vulcanization to the rubber compound having an ionic conductivity. The term "rubber compound having a composite conductivity" denotes a rubber compound exhibiting both the electronic conductivity and the ionic conductivity. The rubber compound having a composite conductivity is prepared by mixing an electronic conductive agent with a rubber having an ionic conductivity or by mixing an electronic conductive agent and an ionic conductive agent with a rubber. Further, the term "rubber having a composite conductivity" denotes a rubber prepared by applying a vulcanization to the rubber compound having a composite conductivity noted above. The rubber elastic body used in the present invention consists of these rubbers.

The electrically conductive powder used in the present invention is prepared by applying a vulcanizing treatment, a curing treatment and a powdering treatment to the rubber compound or the resin mixture mixed with the electrically conductive agent noted above, or a compound of the rubber having an ionic conductivity such as epichlorohydrin noted above. The rubber, the resin and the additives mixed therewith, which are used for preparing the electrically conductive powder, are equal to the rubber, the resin and the additives mixed therewith noted above, which are used for preparing the rubber compound and the resin mixture. An electronic conductive agent is used in the case of manufacturing a powder having an electronic conductivity. On the other hand, an ionic conductive agent or a rubber having an ionic conductivity is used for obtaining a powder having an ionic conductivity. Further, it is possible to obtain a hybrid powder having both an electronic conductivity and an ionic conductivity by using both the electronic conductive agent and the ionic conductive agent or a rubber having an ionic conductivity.

The powdering can be achieved by griding the cured rubber or resin with a grinder or by pulverizing the cured rubber or resin with a pulverizer, though the powdering method is not limited to these griding method and pulverizing method. It is desirable that the electrically conductive powder has a particle diameter not smaller than 0.1 μm and not larger than 1000 μm. The reason is as follows. If the particle diameter is smaller than 0.1 μm, there is no difference between the conductive powder and a conductive agent such as carbon black, and thus the advantage of the present invention cannot be obtained. And, if the particle diameter is larger than 1000 μm, the electrically conductive powder affects the surface of the elastic layer, and degrades its surface characteristics. Preferably, the electrically conductive powder has a particle diameter not smaller than 0.1 μm and not larger than 500 μm. More preferably, the electrically conductive power has a particle diameter not smaller than 1 μm and not larger than 100 μm. Also, it is desirable to obtain the electrically conductive powder by powdering the rubber or resin that has been made electrically conductive, i.e., the rubber or resin having a volume resistivity not higher than $10^9\Omega\cdot$cm, preferably not higher than $10^5\Omega\cdot$cm. Also, in order to obtain the effect of the present invention, it is desirable to mix the electrically conductive powder in an amount of 60 parts by weight or more relative to 100 parts by weight of the polymer into which the electrically conductive powder is dispersed.

In the case of using the electrically conductive power consisting of a thermoplastic resin, it is necessary for the vulcanizing temperature of the rubber compound into which the electrically conductive powder is dispersed to be not higher than the softening temperature of the thermoplastic resin.

When it comes to the hybridization employed in the present invention, various combinations are conceivable in respect of the conductivity types of the electrically conductive powders and the polymers (rubbers or resins) into which the electrically conductive powder is dispersed. Where the polymer exhibits an ionic conductivity, it is possible to use an electrically conductive powder exhibiting an electronic conductivity, or a composite conductivity both an electrically conductivity and an ionic conductivity. On the other hand, where the polymer exhibits an electronic conductivity, it is possible to use an electrically conductive powder exhibiting an ionic conductivity or a composite conductivity. Where the polymer exhibits a composite conductivity, it is possible to use an electrically conductive powder exhibiting an electronic conductivity, an ionic conductivity or a composite conductivity. Further, where the polymer is not electrically conductive, it is possible to use an electrically conductive powder exhibiting a composite conductivity.

It should also be noted that the powder prepared from the rubber or resin can be used as the electrically conductive powder of the present invention exhibiting the ionic conductivity, the electronic conductivity or the composite conductivity. Also, it is possible for the polymer into which the electrically conductive powder is dispersed to be of a single layer structure formed of an elastic body or a sponge body or of a laminate structure including a plurality of layers each formed of an elastic body or a sponge body. By the combination of these aspects, it is possible to provide various types of electrically conductive members in which the electronic-conductivity and the ionic conductivity are hybridized.

In the present invention, the electrically conductive members arranged around the photosensitive drum of the electrophotograph printing apparatus are required to exhibit various electric characteristics. First of all, the electrically conductive member is required to be small in its dependency of the electric characteristics on the environment. The small dependency of, for example, the resistance on the environment denotes a small difference between the resistance under the LL environment and the resistance under the HH environment. To be more specific, it is desirable for the difference in the resistance noted above to be not larger than 1.0 log(Ω·cm). If this requirement is satisfied, the picture image is stabilized regardless of the temperature and the humidity of the environment. It is also required for the dependency of the electric characteristics on voltage to be small. To be more specific, it is desirable for the difference in the resistance between the stage of applying a voltage of 10V and the stage of applying a voltage of 250V to be not larger than 0.5 log(Ω·cm). If this requirement is satisfied, the picture image can be stabilized regardless of the magnitude of the voltage. It is also desirable for the sum of the difference in the resistance relating to the dependency of the resistance on the environment and the difference in the resistance relating to the dependency of the resistance on the voltage to be small. To be more specific, it is desirable for the sum noted above to be not larger than 1.5 log(Ω·cm). Further, even if the electric characteristics noted above are satisfied, it is desirable for the nonuniformity in the resistances within the electrically conductive member to be small. To be more specific, it is desirable for the difference between the maximum resistance and the minimum resistance within the electrically conductive member to be not larger than 0.5 log(Ω·cm).

As a measure for satisfying these requirements, employed in general is the method of dispersing an electronic conductive agent into the compound that has been allowed to exhibit an ionic conductivity so as to achieve the hybridization, thereby moderating the defects inherent in each of the electronic conductivity and the ionic conductivity. Table 2 shows the measured values of the volume resistivity, etc. in respect of the sheet prepared by using the composition shown in Table 2. The sheet, which was sized at 1.5 mm in thickness, 200 mm in width and 300 mm in length, was prepared under the compression molding temperature of 150° C. and the vulcanizing time of 30 minutes. Composition No. 1 shown in Table 2 was prepared by blending Gechron 3106 (trade name of rubber material exhibiting an ionic conductivity, which was manufactured by Zeon corporation) with Gechron 1100 (trade name of rubber material exhibiting an ionic conductivity, which was manufactured by Zeon corporation) so as to set the volume resistance of the mixture at 8.36 log(Ω·cm) under the NN environment. Further, vulcanized rubber sheets were prepared by adding varied amounts of Seast 3 (trade name of HAF carbon black manufactured by Tokai Carbon co., Ltd) to the composition No. 1 referred above, followed by performing the hybridization by the general method described above, thereby obtaining compositions Nos. 2 to 6 and various data shown in Table 2. Incidentally, Hiresta UP (trade name, manufactured by Mitsubishi Chemical Co., Ltd.) was used for measuring the resistance.

TABLE 2

| | No 1 | No 2 | No 3 | No 4 | No 5 | No 6 | No 7 | No 8 | No 9 |
|---|---|---|---|---|---|---|---|---|---|
| Gechron 3106 | 50 | 50 | 50 | 50 | 50 | 50 | 50 | 50 | 50 |
| Gechron 1100 | 50 | 50 | 50 | 50 | 50 | 50 | 50 | 50 | 50 |
| Zinc oxide | 5 | 5 | 5 | 5 | 5 | 5 | 5 | 5 | 5 |
| Sulfur | 1 | 1 | 1 | 1 | 1 | 1 | 1 | 1 | 1 |
| Nocceler CZ | 1 | 1 | 1 | 1 | 1 | 1 | 1 | 1 | 1 |
| Nocceler TT | 0.5 | 0.5 | 0.5 | 0.5 | 0.5 | 0.5 | 0.5 | 0.5 | 0.5 |
| Nocrac 224S | 0.5 | 0.5 | 0.5 | 0.5 | 0.5 | 0.5 | 0.5 | 0.5 | 0.5 |
| Stearic acid | 0.5 | 0.5 | 0.5 | 0.5 | 0.5 | 0.5 | 0.5 | 0.5 | 0.5 |
| Brown Factice PR | 20 | 20 | 20 | 20 | 20 | 20 | 20 | 20 | 20 |
| HAF carbon black (Seast 3) | — | 7.5 | 10 | 12.5 | 15 | 17.5 | 10 | 10 | 10 |
| Conductive rubber (resin) powder | — | — | — | — | — | — | 50 | 75 | 100 |
| Rubber sheet hardness [JIS A] | 55 | 57 | 58 | 60 | 63 | 65 | 62 | 62 | 63 |
| Volume resistance (NN environment) [log(Ω · cm)] | 8.36 | 8.28 | 8.31 | 7.47 | 7.00 | 5.60 | 8.33 | 8.19 | 7.96 |
| Dependency on environment *1 [log(Ω · cm)] | 1.76 | 1.81 | 1.85 | 1.85 | 1.68 | 0.84 | 1.37 | 0.94 | 0.33 |
| Dependency on voltage *2 [log(Ω · cm)] | 0.11 | 0.08 | 0.13 | 0.54 | 0.84 | 1.78 | 0.30 | 0.17 | 0.16 |
| *1 + *2 | 1.87 | 1.89 | 1.98 | 2.39 | 2.52 | 2.62 | 1.67 | 1.11 | 0.49 |

TABLE 2-continued

| | No 1 | No 2 | No 3 | No 4 | No 5 | No 6 | No 7 | No 8 | No 9 |
|---|---|---|---|---|---|---|---|---|---|
| Nonuniformity of resistances [log(Ω · cm)] | 0.27 | 0.28 | 0.43 | 0.83 | 1.75 | 2.43 | 0.34 | 0.37 | 0.41 |
| Evaluation of printed image | poor | poor | poor | poor | poor | poor | poor | good | good |

*1: (LL environment-HH environment)
*2: (value under 10 V-250 V)
Nonuniformity of resistances denotes the difference between the maximum value and the minimum value.
NN environment: resistance under temperature of 23° C. and relative humidity of 55%
LL environment: resistance under temperature of 10° C. and relative humidity of 15%
HH environment: resistance under temperature of 50° C. and relative humidity of 85%

Figure 11:
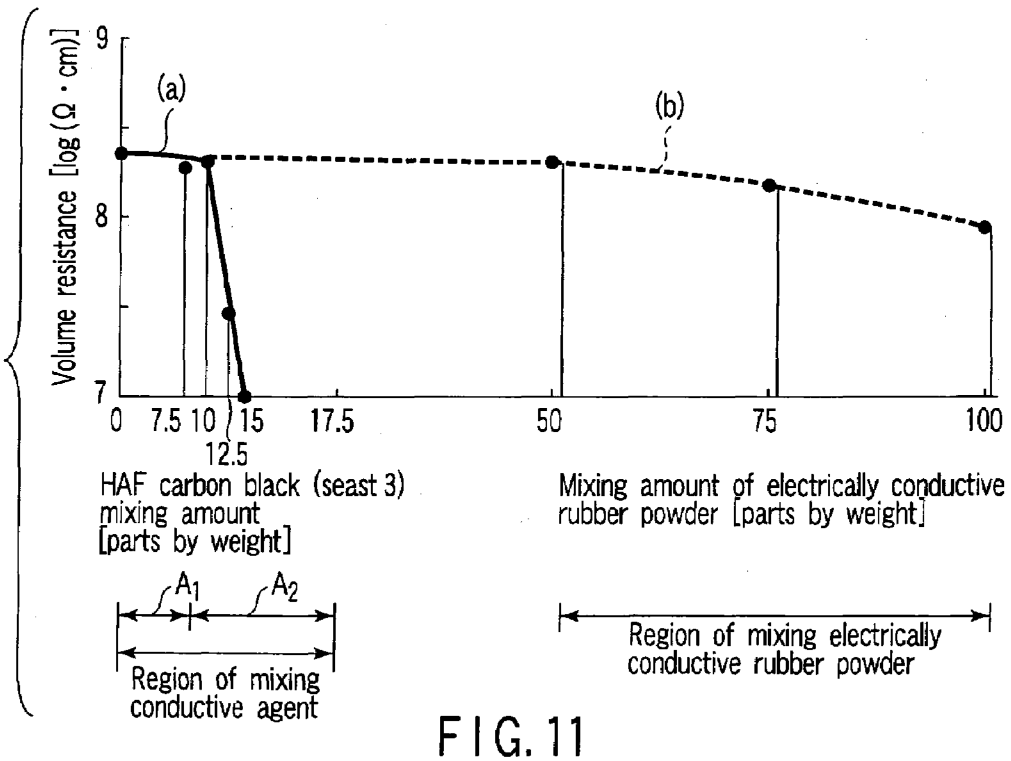
FIG. 11 is a graph showing the relationship between the volume resistivity and the mixing amount of the conductive agent and the relationship between the volume resistivity and the electrically conductive rubber powder.

As apparent from Table 2, each of the compositions Nos. 1 to 3, which was small in variation of the resistance and in the dependency of the resistance on voltage, exhibited a large value in respect of the dependency of the resistance on the environment. Also, each of these compositions was found to be small in the nonuniformity of the resistances. It should be noted that the compositions Nos. 1 to 3 correspond to region $A_1$ shown in FIG. 11, which is small in variation. FIG. 11 is a graph showing the relationship between the mixing amount of the conductive HAF carbon black (Seast 3) to the rubber compound and the volume resistance (curve (a)) and the relationship between the mixing amount of the electrically conductive rubber powder of the present invention to the rubber compound and the volume resistance (curve (b)).

On the other hand, the addition amount of HAF carbon black (Seast 3) was increased in compositions Nos. 4 to 6 so as to bring about a rapid variation in the volume resistance. In each of these compositions, the dependency of the resistance on voltage is increased, and the dependency of the resistance on the environment is decreased. Also, the nonuniformity of the resistances is increased. It should be noted that these compositions Nos. 4 to 6 correspond to region $A_2$ shown in FIG. 11, in which the resistance is rapidly varied.

FIG. 9 is a graph showing the nonuniformity of the resistances. As apparent from FIG. 9, it has been clarified that, if the mixing amount of carbon black is increased, the volume resistance is rapidly lowered when the mixing amount of carbon black exceeds 10 parts by weight, and the nonuniformity of the resistances, i.e., the difference between the maximum value and the minimum value, is also increased. The experimental data given in FIG. 9 support that it is difficult to control the resistance in the middle resistance region.

Specific Examples of the present invention will now be described.

Examples 1 to 3 and Comparative Examples 1 and 2 given in the following cover the cases given below:

COMPARATIVE EXAMPLE 1

Used was composition No. 3 (mixing ratio of HAF carbon black (Seast 3): 10 parts by weight), which was small in variation of the resistances.

COMPARATIVE EXAMPLE 2

The electrically conductive rubber powder, which was allowed to exhibit the resistance of 4 log(Ω·cm) or less so as to be made conductive, was added to composition No. 3 in an amount equal to that for composition No. 7.

EXAMPLE 1

The electrically conductive rubber powder, which was allowed to exhibit the resistance of 4 log(Ω·cm) or less so as to be made conductive, was added to composition No. 3 in an amount equal to that for composition No. 8.

EXAMPLE 2

The electrically conductive rubber powder, which was allowed to exhibit the resistance of 4 log(Ω·cm) or less so as to be made conductive, was added to composition No. 3 in an amount equal to that for composition No. 9.

EXAMPLE 3

The electrically conductive resin powder, which was allowed to exhibit the resistance of 4 log(Ω·cm) or less so as to be made conductive, was added to composition No. 3 in place of the electrically conductive rubber powder for composition No. 9.

EXAMPLE 1

A charging roll having an outer diameter of 15 ϕ and a rubber length of 320 mm was prepared by the ordinary rubber roll making method. The composition No. 8 shown in Table 2 was used for preparing the charging rubber roll. Used as the raw material rubbers were Gechron 1100 and Gechron 3100 (trade names of rubber raw materials having an ionic conductivity and manufactured by Zeon corporation). Also, used as the electronic conductive agent was Seast 3 (trade name of HAF carbon black manufactured by Tokai Carbon Co., Ltd). General additives for rubber as shown in Table 2 were used as the other additives.

The charging roll was made by the process steps 1) to 7) given below:

1) In the first step, the composition No. 8 was mixed, followed by performing the mixed compound in the shape of a ribbon.

2) The rubber compound preformed in step 1) was extruded by using an extruder manufactured by Mitsuba Mfg. co., Ltd onto a mandrel of 6ϕ so as to form a rubber layer having an outer diameter of 17ϕ in a manner to cover the mandrel.

3) The rubber layer that was extruded to have a prescribed rubber outer diameter in step 2) was subjected to the vulcanizing treatment together with the mandrel in an oven at 160° C. for 60 minutes.

4). After the vulcanization, the rubber layer was withdrawn from the mandrel, followed by inserting the withdrawn rubber layer onto the metal core for the product having a diameter of 6ϕ. In this case, the metal core was coated in advance with an adhesive.

5) Further, the rubber layer was ground with a griding machine so as to decrease the outer diameter of the rubber layer to 15φ, and the both edges of the rubber layer were cut so as to allow the rubber layer to have a prescribed length of 320 mm.

6) Then, the rubber layer was coated in a thickness of 15 μm with a polyurethane modified fluorine resin manufactured by Nippon Bee Chemical co., Ltd by a spray coating method.

7) Finally, the rubber layer coated with the resin was baked in an oven at 160° C. for 15 minutes so as to obtain a desired charging roll.

In the next step, prepared was a hybrid rubber powder used in this Example, which exhibited the composite conductivity of the ionic conductivity and the electronic conductivity. The hybrid rubber powder was prepared by the steps given below:

1) In the first step, composition A shown in Table 3 below was mixed, followed by performing the mixed compound in shape of sheet.

2) The rubber compound obtained in step 1) was wound about a metal core prepared in advance so as to form a rubber layer, followed by spirally winding a ribbon-shaped cloth around the rubber layer.

3) Then, the rubber layer spirally wound with the cloth in step 2) was put together with the metal core in an autoclave having a steam pressure of 5.5 kg/cm$^2$ for the vulcanization treatment for 120 minutes.

4) After the vulcanization treatment, the cloth spirally winding the rubber layer was released.

5) Further, the rubber layer after the vulcanization treatment was ground so as to prepare an electrically conductive rubber powder having an average particle diameter of 5 μm, thereby obtaining an electrically conductive rubber powder used in the compositions Nos. 7, 8 and 9 shown in Table 2.

Figure 1:
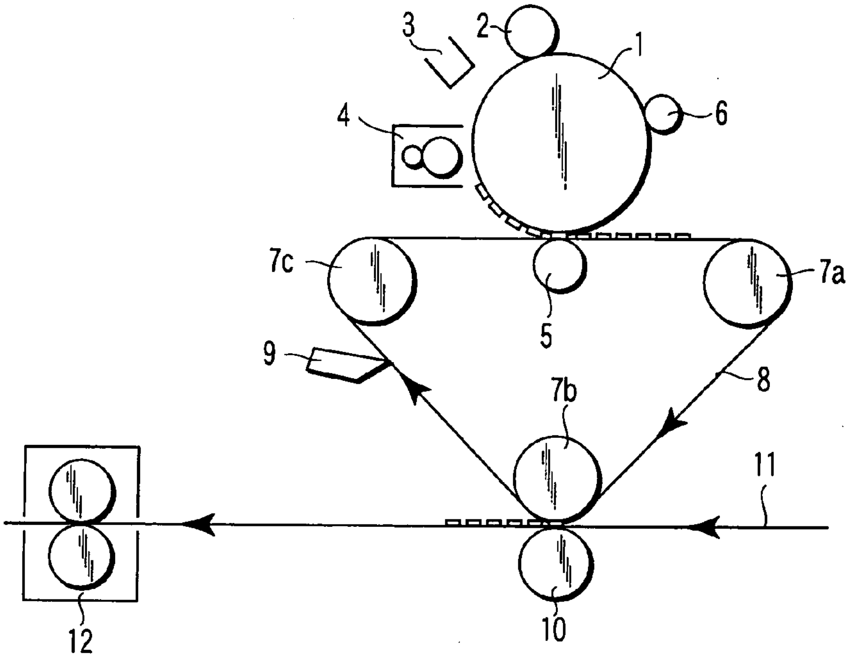
FIG. 1 schematically shows the construction of an electrophotographic printing apparatus.

In the next step, a printing test was conducted by applying a voltage of 1,000V with the charging roll thus prepared used as the charging roll 2 included in the electrophotograph printing apparatus shown in FIG. 1. As a result, the charging was performed uniformly, and a good picture image was reproduced. It was also confirmed that it was possible to reproduce a good picture image under the LL environment and the HH environment.

EXAMPLE 2

A charging roll was prepared as in Example 1 by using the composition No. 9 shown in Table 2, except that the mixing amount of the electrically conductive composite rubber powder was varied. The charging roll for Example 2 was found to exhibit a hardness of 64°, a volume resistance under the NN environment of 8.11 log(Ω·cm), a dependency of the resistance on the environment, i.e., the difference between the value under the LL environment and the value under the HH environment, of 0.43 log(Ω·cm), and a dependency of the resistance on voltage, i.e., the difference between the value under the voltage of 10V and the value under the voltage of 250V, of 0.38 log(Ω·cm). Also, the difference between the maximum value and the minimum value of the resistance within the roll was found to be 0.38 log(Ω·cm).

In the next step, a printing test was conducted as in Example 1 by applying a voltage of 1,000V with the charging roll thus prepared used as the charging roll 2 included in the electrophotograph printing apparatus shown in FIG. 1. As a result, the charging was performed uniformly, and a good picture image was reproduced. It was also confirmed that it was possible to reproduce a good picture image under the LL environment and the HH environment.

TABLE 3

| Composition A | | Composition B | | Composition C | |
|---|---|---|---|---|---|
| Gechron 3100 | 100 parts by weight | Zest P-21 | 100 parts by weight | Gechron 3100 | 100 parts by weight |
| Zinc oxide | 5 parts by weight | Magnesium stearate | 2 parts by weight | Zinc oxide | 5 parts by weight |
| Sulfur | 1 parts by weight | DOP | 80 parts by weight | Sulfur | 1 parts by weight |
| Nocceler DM-P | 1 parts by weight | Seast 3 | 65 parts by weight | Nocceler DM-P | 1 parts by weight |
| Nocceler TT | 0.5 parts by weight | Hardness | 65° | Nocceler TT | 0.5 parts by weight |
| Nocrac 224S | 0.5 parts by weight | Volume resistance (NN environment) | 4.0 logΩ · cm or less | Nocrac 224S | 0.5 parts by weight |
| Stearic acid | 0.5 parts by weight | | | Stearic acid | 0.5 parts by weight |
| Brown Factice PR | 20 parts by weight | | | Brown Factice PR | 20 parts by weight |
| Seast 3 | 45 parts by weight | | | Volume resistance (NN environment) | 5.0 logΩ · cm or less |
| Volume resistance (NN environment) | 4.0 logΩ · cm or less | | | | |

Figure 2:
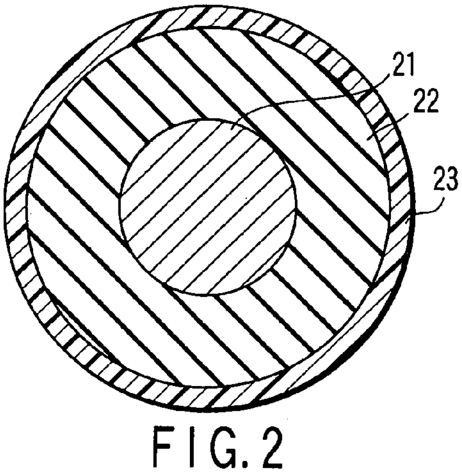
FIG. 2 is a cross-sectional view schematically showing the construction of a charging roll for Examples 1 to 5 of the present invention.

FIG. 2 shows the construction of the charging roll for Example 1. As shown in the drawing, the charging roll comprised a rubber layer (electrically conductive elastic layer) 22 formed on the core metal (substrate) 21, and a toner releasing layer 23 formed on the rubber layer 22. The rubber layer 22 was prepared by dispersing an electrically conductive rubber powder having a composite conductivity into an electrically conductive composite (hybrid) rubber exhibiting both the ionic conductivity and the electronic conductivity.

The charging roll for Example 1 was found to exhibit a hardness of 61°, a volume resistance value under the NN environment of 8.15 log(Ω·cm), a dependency of the resistance on the environment, i.e., the difference between the value under the LL environment and the value under the HH environment, of 0.93 log(Ω·cm), and a dependency of the resistance on voltage, i.e., the difference between the value under the voltage of 10V and the value under the voltage of 250V, of 0.17 log(Ω·cm). Also, the difference between the maximum value and the minimum value of the resistance within the roll was found to be 0.36 log(Ω·cm).

EXAMPLE 3

A charging roll was prepared by using a resin powder having an electronic conductivity, instead of the composite conductive rubber powder used in composition No. 9 shown in Table 2. The electrically conductive resin powder was prepared by the steps given below:

1) Mixing was performed in a Shinagawa mixer with the composition B shown in Table 3, i.e., vinyl chloride (trade name of Zest P-21 manufactured by Zeon corporation), magnesium stearate, Seast 3 and the half amount of DOP.

2) In the next step, the remaining half amount of DOP was added bit by bit to the mixture that was sufficiently mixed in step 1) so as to prepare a paste.

3) Then, the paste was poured into a mold having a core metal arranged therein, followed by thermally curing the paste at 160° C. for 180 minutes.

4) Further, after the cooling, the molded material was released from the mold so as to obtain an electrically conductive resin roll.

5) Still further, the resin roll was ground so as to obtain an electrically conductive resin powder having an average particle diameter of 5 μm.

The electrically conductive resin powder thus obtained was used as an additive of the composition No. 9 in place of the electrically conductive rubber powder as in Example 2. The charging roll for Example 3 was found to exhibit a hardness of 62°, a volume resistance under the NN environment of 8.23 log(Ω·cm), a dependency of the resistance on the environment, i.e., the difference between the value under the LL environment and the value under the HH environment, of 0.53 log(Ω·cm), and a dependency of the resistance on voltage, i.e., the difference between the value under the voltage of 10V and the value under the voltage of 250V, of 0.44 log(Ω·cm). Also, the difference between the maximum value and the minimum value of the resistance within the roll was found to be 0.36 log(Ω·cm).

In the next step, a printing test was conducted as in Example 1 by applying a voltage of 1,000V with the charging roll thus prepared used as the charging roll 2 included in the electrophotograph printing apparatus shown in FIG. 1. As a result, the charging was performed uniformly, and a good picture image was reproduced. It was also confirmed that it was possible to reproduce a good picture image under the LL environment and the HH environment.

COMPARATIVE EXAMPLE 1

A charging roll was prepared for comparison by the moderating method, which is generally employed, of the electric characteristics of the ionic conductivity and the electronic conductivity by the hybrid conductivity.

Specifically, a charging roll having an outer diameter of 15ϕ and a length of 320 mm was prepared by using the composition No. 3 shown in Table 2 by the process similar to that employed in Example 1. A toner releasing layer was also formed as in Example 1.

The charging roll for COMPARATIVE EXAMPLE 1 was found to exhibit a hardness of 58°, a volume resistance under the NN environment of 8.29 log(Ω·cm), a dependency of the resistance on the environment, i.e., the difference between the value under the LL environment and the value under the HH environment, of 1.85 log(Ω·cm), and a dependency of the resistance on voltage, i.e., the difference between the value under the voltage of 10V and the value under the voltage of 250V, of 0.13 log(Ω·cm). Also, the difference between the maximum value and the minimum value of the resistance within the roll was found to be 0.43 log(Ω·cm).

In the next step, a printing test was conducted as in Example 1 by applying a voltage of 1,000V with the charging roll thus prepared used as the charging roll 2 included in the electrophotograph printing apparatus shown in FIG. 1. As a result, a good picture image was reproduced under the NN environment. However, the resistance was rendered excessively high under the LL environment and was rendered excessively low under the HH environment, resulting in failure to reproduce a satisfactory picture image.

COMPARATIVE EXAMPLE 2

A charging roll having an outer diameter of 15ϕ and a length of 320 mm was prepared by using the composition No. 7 shown in Table 2 by the ordinary process similar to the making process of the charging roll for Example 1.

The charging roll for COMPARATIVE EXAMPLE 2 was found to exhibit a hardness of 61°, a volume resistance value under the NN environment of 8.23 log(Ω·cm), a dependency of the resistance on the environment, i.e., the difference between the value under the LL environment and the value under the HH environment, of 1.37 log(Ω·cm), and a dependency of the resistance on voltage, i.e., the difference between the value under the voltage of 10V and the value under the voltage of 250V, of 0.30 log(Ω·cm). Also, the difference between the maximum value and the minimum value of the resistance within the roll was found to be 0.34 log(106 ·cm)

In the next step, a printing test was conducted as in Example 1 by applying a voltage of 1,000V with the charging roll thus prepared used as the charging roll 2 included in the electrophotograph printing apparatus shown in FIG. 1. The result of the experiment was similar to that for Comparative Example 1.

The result of the experiment with respect to compositions Nos. 1 to 9 shown in Table 2 will now be pointed out. Specifically, compositions Nos. 1 to 6 denote the hybridization technology that is generally employed. Compositions Nos. 1 to 3 were found to be small in the dependency of the resistance on voltage. However, the dependency of the resistance of these compositions on the environment was found to be not smaller than 1.0 log(Ω·cm), with the result that the evaluation of the reproduced picture image was not satisfactory. The compositions Nos. 4 to 6 were found to be poor in the dependency of the resistance on each of the environment and voltage. Also, the nonuniformity in the resistances within the roll was large, leading to a poor evaluation of the reproduced picture image. Compositions Nos. 7 to 9 denote the hybridization technology according to the present invention, which was carried out by mixing an electrically conductive rubber or resin powder by the method of moderating the electric characteristics of the ionic conductivity and the electronic conductivity. The mixing amount of the electrically conductive rubber powder was not enough in composition No. 7, with the result that the improvement in the electric characteristics was insufficient in composition No. 7. On the other hand, compositions Nos. 8 and 9 achieved an improvement in the dependency of the resistance on each of the environment and voltage as well as in the nonuniformity of the resistances so as to make it possible to reproduce the picture image with a high stability.

EXAMPLE 4

A roll was prepared by the process similar to that in Example 1 by using the composition for Example 4 shown in Table 4 below. The electrically conductive powders A to C shown in Table 4 denote the electrically conductive powders obtained by curing and powdering the rubber compounds or resin mixtures of the electrically conductive powder compositions A to C shown in Table 3. The roll thus obtained consisted of a metal core, an electrically conductive elastic layer formed on the metal core, and a toner releasing layer formed on the electrically conductive elastic layer. The electrically conductive elastic layer was formed of a composite conductivity (hybrid) rubber sponge exhibiting both an electronic conductivity and an ionic conductivity and having a rubber powder exhibiting an ionic conductivity mixed therewith. The hardness of the roll was found to be 10 (JIS-A).

The roll for Example 4 was used as the transfer roll 5 shown in FIG. 1. The transfer was performed uniformly regardless of the change in voltage and environment so as to achieve a satisfactory printing of the picture image.

EXAMPLE 5

A roll was prepared by the process similar to that in Example 1 by using the composition for Example 5 shown in Table 4 below. The roll thus obtained consisted of a metal core, an electrically conductive elastic layer formed on the metal core, and a toner releasing layer formed on the electrically conductive elastic layer. The electrically conductive elastic layer was formed of a rubber sponge exhibiting an ionic conductivity and having a resin powder exhibiting an electronic conductivity mixed therewith. The hardness of the roll was found to be 5 (JIS-A).

The roll for Example 5 was used as the transfer roll 5 shown in FIG. 1, with the result similar to that obtained in Example 4.

TABLE 4

| | Examples | | | | | |
|---|---|---|---|---|---|---|
| | 4 | 5 | 6 | 7 | 8 | 9 |
| Gechron 3106 | 50 | 50 | 50 | — | — | — |
| Gechron 1100 | 50 | 50 | 50 | — | — | — |
| EPT4045H | — | — | — | 100 | 100 | 100 |
| Zinc oxide | 5 | 5 | 5 | 5 | 5 | 5 |
| Sulfur | 1 | 1 | 1 | 1 | 1 | 1 |
| Nocceler CZ | 1 | 1 | 1 | 1 | 1 | 1 |
| Nocceler TT | 0.5 | 0.5 | 0.5 | 0.5 | 0.5 | 0.5 |
| Nocrac 224S | 0.5 | 0.5 | 0.5 | 0.5 | 0.5 | 0.5 |
| Stearic acid | 0.5 | 0.5 | 0.5 | 0.5 | 0.5 | 0.5 |
| Brown Factice PR | 20 | 20 | 20 | 20 | 20 | 20 |
| Neocellborn N#1000 | 10 | 15 | — | — | 10 | — |
| Seast 3 | 10 | — | — | 10 | 10 | — |
| Electrically conductive powder A | — | — | 65 | — | 85 | 100 |
| Electrically conductive powder B | — | 65 | — | — | — | — |
| Electrically conductive powder C | 65 | — | — | 85 | — | — |

EXAMPLE 6

In the first step, the rubber compound prepared by mixing the composition for Example 6 shown in Table 4 was dissolved in toluene so as to prepare a toluene solution. Then, a belt-like substrate coated with an adhesive on its surface, having an outer diameter of 24.8 mm and formed of a polyimide resin layer having a thickness of 50 μm was coated with the toluene solution, followed by evaporation of toluene and subsequently cured thermally the coated film at 120° C. for 30 minutes. As a result, obtained was a transfer belt comprising the resin belt substrate and an rubber layer exhibiting an ionic conductivity and formed on the belt substrate. A composite conductive (hybrid) rubber powder exhibiting an electronic conductivity and an ionic conductivity was dispersed in the rubber layer exhibiting the ionic conductivity.

Figure 3:
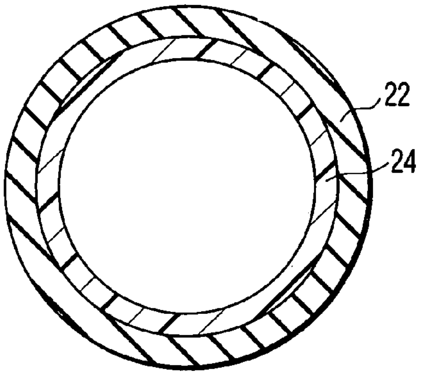
FIG. 3 is a cross-sectional view schematically showing the construction of a transfer belt for Example 6 of the present invention.
Figure 4:
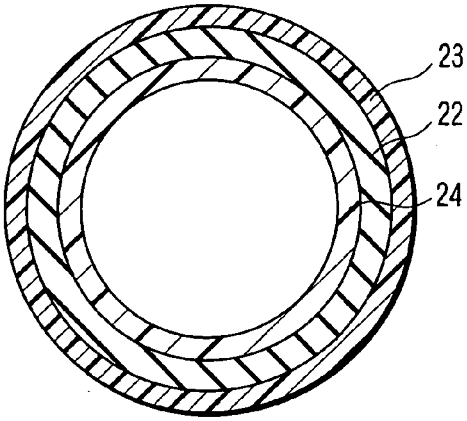
FIG. 4 is a cross-sectional view schematically showing the construction of a transfer belt for Example 7 of the present invention.
Figure 5:
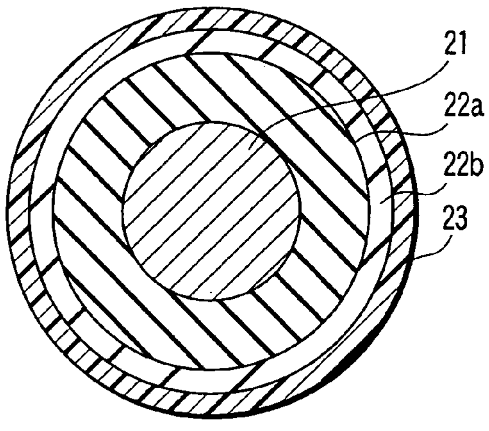
FIG. 5 is a cross-sectional view schematically showing the construction of a transfer roll for each of Examples 8 and 9 of the present invention.

The construction of the transfer belt obtained in Example 6 is shown in FIG. 3. As shown in the drawing, the transfer belt was prepared by forming a rubber layer (electrically conductive elastic layer) 22 on a resin belt layer (substrate) 24 consisting of a polyimide resin. The rubber layer 22 was prepared by dispersing a composite conductive (hybrid) rubber powder exhibiting an ionic conductivity and an electronic conductivity into a rubber exhibiting an ionic conductivity.

The transfer belt thus obtained was used as a transfer belt of a copying machine that did not include an intermediate transfer belt, with the result that it was possible to obtain a satisfactory reproduced picture image regardless of the change in voltage and environment.

EXAMPLE 7

In the first step, the process similar to that for Example 6 was carried out by using the composition for Example 7 shown in Table 4. Then, the surface of the belt was coated by spraying method with an FEUA modified fluorine resin composition manufactured by Asahi Glass K.K. in a thickness of 10 μm so as to obtain an intermediate transfer belt.

The intermediate transfer belt thus obtained was constructed to include a resin belt substrate, a rubber layer formed on the belt substrate, said rubber layer exhibiting an ionic conductivity and having a rubber powder exhibiting an electronic conductivity dispersed therein, and a toner releasing layer formed on the rubber layer. A printing test was conducted by mounting the intermediate transfer belt thus obtained to the electrophotograph printing apparatus shown in FIG. 1 as the intermediate transfer belt 8, with the result that it was possible to obtain a satisfactory reproduced picture image regardless of the change in voltage and environment.

EXAMPLE 8

A roll was prepared by co-extrusion of two layers, consisting of an upper layer formed of a rubber compound prepared by mixing the composition for Example 8 shown in Table 4 and a lower layer formed of an insulating rubber compound prepared by using EPDM with known additives such as a vulcanizing agent, a vulcanization accelerator, an antioxidant and a softening agent. It should be noted that the manufacturing process of the roll in this Example was equal to that for Example 1, except that two layers were co-extruded in Example 8.

The roll thus obtained was constructed to include a metal core, two rubber layers formed on the metal core, and a toner releasing layer formed on the upper rubber layer. The upper rubber layer **22*b*** was formed of a rubber sponge exhibiting an electronic conductivity and prepared by dispersing a composite conductive (hybrid) rubber powder exhibiting an electronic conductivity and an ionic conductivity into the rubber noted above.

The roll thus obtained was used as the transfer roll 10 shown in FIG. 1, with the result that it was possible to obtain a satisfactory reproduced picture image regardless of the change in voltage and environment.

EXAMPLE 9

A roll was prepared by co-extrusion of two layers, consisting of an upper layer formed of a rubber compound prepared by mixing the composition for Example 9 shown in Table 4 and a lower layer formed of a rubber compound of the composition similar to that for Example 4. It should be noted that the manufacturing process of the roll in this Example was equal to that for Example 1, except that two layers were co-extruded in Example 9.

The roll thus obtained was constructed to include a metal core, two rubber layers formed on the metal core, and a toner releasing layer formed on the upper rubber layer. The upper rubber layer **22*b* was formed of a rubber layer having a composite conductive (hybrid) rubber powder exhibiting an electronic conductivity and an ionic conductivity dispersed thereinto. On the other hand, the lower rubber layer 22*a*** was formed of a composite conductivity (hybrid) rubber sponge layer having a rubber powder exhibiting an ionic conductivity dispersed thereinto.

The roll thus obtained was used as the transfer roll 10 shown in FIG. 1, with the result that it was possible to obtain a satisfactory reproduced picture image regardless of the change in voltage and environment.

The present invention is not limited to the embodiments described above. It is possible to modify the constituting factors of the invention without departing from the range of the present invention in actually working the invention. Also, it is possible to achieve various inventions by combining appropriately a plurality of constituting factors of the invention disclosed in the embodiments described above. For example, it is possible to delete some constituents of the invention from all the constituents disclosed in the embodiments described above. Further, it is possible to combine appropriately the constituents belonging to different embodiments of the present invention.

What is claimed is:

1. An electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into an epichlorohydrin rubber compound having ionic conductivity, followed by vulcanizing the epichlorohydrin rubber compound having ionic conductivity, said electrically conductive powder being obtained by curing and powdering an epichlorohydrin rubber compound having composite conductivity which is prepared by mixing an electronic conductive agent with the epichlorohydrin rubber compound having ionic conductivity.

2. The electrically conductive member according to claim 1, wherein the electrically conductive elastic layer is formed of a sponge layer.

3. The electrically conductive member according to claim 1, wherein the electrically conductive powder has a volume resistance not larger than $10^9$ ●·cm and a particle diameter not smaller than 0.1 ● m.

4. An electrically conductive member comprising a substrate of a metal or a resin and a plurality of layers formed to cover the substrate, wherein at least one or more of the plural layers that are formed to cover the substrate are made of the electrically conductive elastic layer defined in claim 1.

5. The electrically conductive member according to claim 1, wherein a toner releasing layer is formed to constitute the surface layer of the electrically conductive member.

6. The electrically conductive member according to claim 1, which is used as at least any one of the transfer roll, the charging roll, the developing roll, the cleaning roll, the transfer belt, the intermediate transfer belt, and the intermediate transfer drum.

7. The electrically conductive member according to claim 1, wherein one or both of the epichlorohydrin rubber compound giving rise to the electrically conductive powder and the epichlorohydrin rubber to which the electrically conductive powder is dispersed, is an alloy of an epichlorohydrin rubber and a rubber selected from any of a natural rubber, a nitrile rubber, a hydrogenated nitrile rubber, a butadiene rubber, a styrene-butadiene rubber, an isoprene rubber, an ethylene-propylene rubber, a fluorinated rubber and a silicone rubber.

8. An electrically conductive member, comprising a substrate of a metal or a resin and an electrically conductive elastic layer formed to cover the substrate, wherein the electrically conductive elastic layer is formed of a rubber elastic body prepared by dispersing an electrically conductive powder into an epichlorohydrin rubber compound having composite conductivity which is prepared by mixing an electronic conductive agent with an epichlorohydrin rubber compound having ionic conductivity, followed by vulcanizing the epichlorohydrin rubber compound having composite conductivity, said electrically conductive powder being obtained by curing and powdering an epichlorohydrin rubber compound having composite conductivity which is prepared by mixing an electronic conductive agent with the epichlorohydrin rubber compound having ionic conductivity.

9. The electrically conductive member according to claim 8, wherein the electrically conductive elastic layer is formed of a sponge layer.

10. The electrically conductive member according to claim 8, wherein the electrically conductive powder has a volume resistance not larger than $10^9$ ●·cm and a particle diameter not smaller than 0.1 ● m.

11. An electrically conductive member comprising a substrate of a metal or a resin and a plurality of layers formed to cover the substrate, wherein at least one or more of the plural layers that are formed to cover the substrate are made of the electrically conductive elastic layer defined in claim 8.

12. The electrically conductive member according to claim 8, wherein a toner releasing layer is formed to constitute the surface layer of the electrically conductive member.

13. The electrically conductive member according to claim 8, which is used as at least any one of the transfer roll, the charging roll, the developing roll, the cleaning roll, the transfer belt, the intermediate transfer belt, and the intermediate transfer drum.

14. The electrically conductive member according to claim 8, wherein one or both of the epichlorohydrin rubber compound giving rise to the electrically conductive powder and the epichlorohydrin rubber to which the electrically conductive powder is dispersed, is an alloy of an epichlorohydrin rubber and a rubber selected from any of a natural rubber, a nitrile rubber, a hydrogenated nitrile rubber, a butadiene rubber, a styrene-butadiene rubber, an isoprene rubber, an ethylene-propylene rubber, a fluorinated rubber and a silicone rubber.

* * * * *